United States Patent [19]
Yamada

[11] 3,910,766
[45] *Oct. 7, 1975

[54] APPARATUS FOR REMOVING NOXIOUS SUBSTANCES FROM CHIMNEY EXHAUST GAS

[76] Inventor: Kiichi Yamada, No. 15-12, 1-Chome, Jingumae, Shibuya-Ku, Tokyo, Japan

[*] Notice: The portion of the term of this patent subsequent to Dec. 18, 1990, has been disclaimed.

[22] Filed: Apr. 24, 1973

[21] Appl. No.: 354,073

[30] Foreign Application Priority Data
Oct. 6, 1972   Japan.................... 47-100493

[52] U.S. Cl................ 23/260; 23/284; 55/233; 55/259; 261/17
[51] Int. Cl.²............... B01D 47/06; B01J 10/00
[58] Field of Search......... 23/260, 284; 55/269, 73, 55/228, 233, 316, 242; 261/17

[56] References Cited
UNITED STATES PATENTS

| | | | |
|---|---|---|---|
| 2,057,579 | 10/1936 | Kurth | 55/233 X |
| 2,789,032 | 4/1957 | Bagley et al. | 23/260 X |
| 3,771,315 | 11/1973 | Scott | 55/DIG. 30 X |
| 3,773,472 | 11/1973 | Hausberg et al. | 23/260 X |
| 3,779,709 | 12/1973 | Yamada | 23/260 |

*Primary Examiner*—Morris O. Wolk
*Assistant Examiner*—Arnold Turk
*Attorney, Agent, or Firm*—Silverman & Cass, Ltd.

[57] ABSTRACT

A device for removing noxious substances from chimney exhaust gas by using a first filtering chamber which collects dust particles by using sticky dust remover, a second filtering chamber which separates sulfurous acid gas and nitrogen oxides by caustic soda, and a third filtering chamber removing any residual pollutants in the exhaust gas.

5 Claims, 2 Drawing Figures

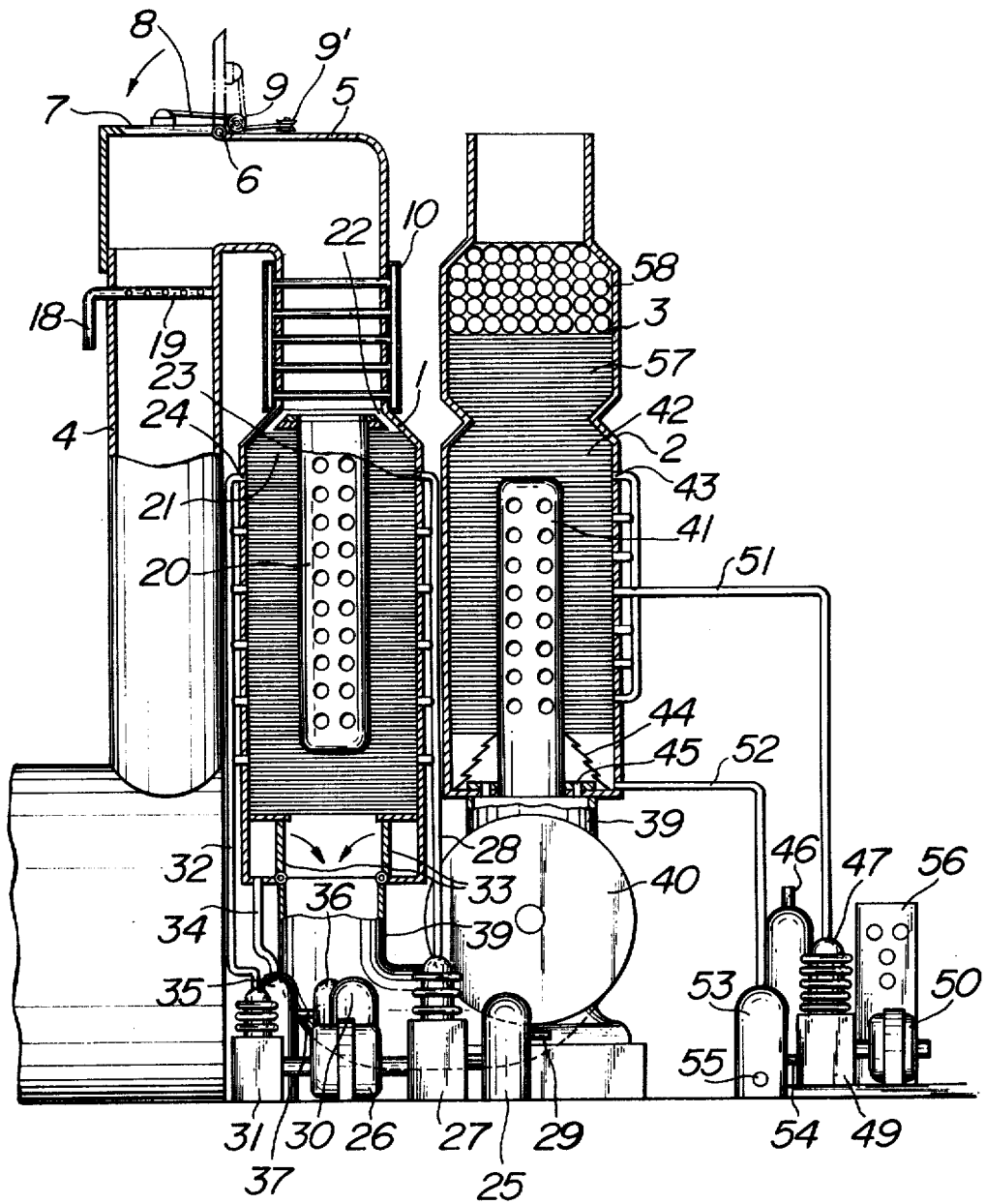
FIG_1

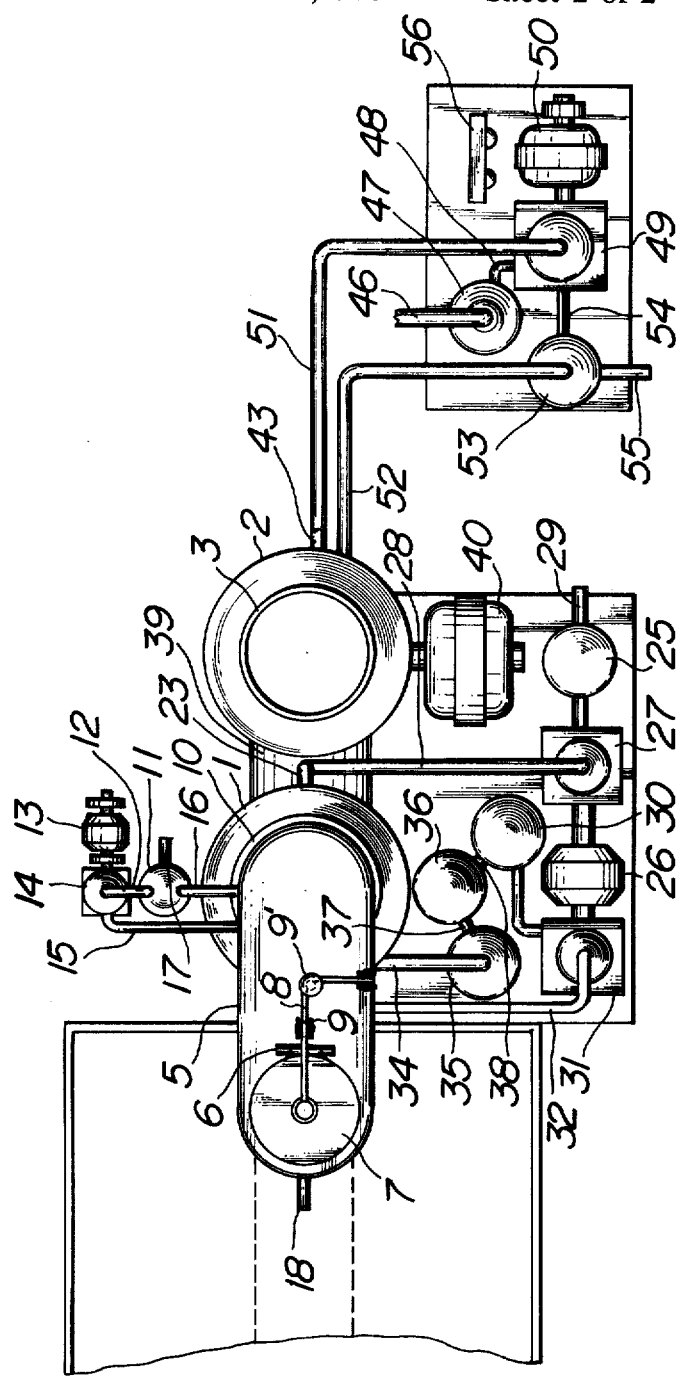

3,910,766

APPARATUS FOR REMOVING NOXIOUS SUBSTANCES FROM CHIMNEY EXHAUST GAS

BACKGROUND OF THE INVENTION

1. Field of the Invention

This invention relates to an apparatus for removing noxious substances from chimney exhaust gas. More particularly, this invention provides an apparatus for removing noxious substances such as dust particles, carbon monoxide, nitrogen oxides, sulfurous acid gas, and the like from exhaust gas at factory chimneys, such as iron works, steel works, electric power plants using fossil fuels, oil refineries, and the like.

2. Description of the Prior Art

There is an increasing public concern on air pollution which is caused by exhaust gas from large industrial plants, especially pollution by sulfurous acid gas ($SO_2$) at and in the proximity of plants where heavy oil is burnt as a sole fuel. To prevent air pollution by sulfurous acid gas ($SO_2$), the following three approaches have been practised so far.

1. Direct removal of sulfur from fuel.
2. Removal of sulfurous acid gas ($SO_2$) from exhaust gas.
3. Acceleration of dispersion in air, by using extremely tall chimneys or by releasing exhaust gas at a very high speed.

A number of different schemes have been proposed heretofore for the prevention of air pollution based on the aforesaid approaches. However, none of the conventionally proposed methods and devices for preventing air pollution from industrial plants is satisfactory for practical applications.

Therefore, an object of the present invention is to provide an improved apparatus for preventing air pollution based on the second one of the aforesaid three approaches.

SUMMARY OF THE INVENTION

According to the present invention, there is provided an apparatus for removing noxious substances from chimney exhaust gas, comprising a first filtering chamber having an outlet and an inlet communicating with the top end of the chimney through a communicating with the top end of the chimney through a bent duct and having spongy filtering members stuffed therein to assist in the removal of dust particles in the exhaust gas, a cooling means mounted on one end of the bent duct near to the inlet of the first filtering chamber, a gas distributing tube having a plurality of perforations and extending downwardly from the inlet of the first filtering chamber toward the outlet thereof, a means for impregnating a liquid dust-adsorbing agent in the spongy filtering members in the first filtering chamber, a means for spraying a washing liquid on the spongy filtering members in the first filtering chamber, a second filtering chamber having an outlet and an inlet communicating with the outlet of the first filtering chamber through a duct provided with a motor-driven blower and having spongy filtering members stuffed therein to assist in the removal of sulfurous acid gas and other noxious substances in the exhaust gas, a gas distributing tube having a plurality of perforations and extending upwardly from the inlet of the second filtering chamber toward the outlet thereof, a means for causing circulation of caustic soda solution through the spongy filtering members in the second filtering chamber so as to absorb sulfurous acid gas and other noxious substances in the exhaust gas, and a third filtering chamber mounted at the outlet of the second filtering chamber and carrying spongy filtering members and activated charcoal therein to assist in the removal of any residual noxious substances in the exhaust gas, said third filtering chamber having an outlet for treated gas.

BRIEF DESCRIPTION OF THE DRAWING

For a better understanding of the invention, reference is made to the accompanying drawing, in which:

FIG. 1 is a schematic elevation of a device for removing noxious substances from chimney exhaust gas, according to the present invention; and FIG. 2 is a schematic plan view of the device.

Like parts are designated by like numerals throughout the different figures of the drawing.

DESCRIPTION OF THE PREFERRED EMBODIMENT

Referring to a preferred embodiment of the invention, as illustrated in the figures, a noxious substance removing device includes a first filtering chamber 1, a second filtering chamber 2, and a third filtering chamber 3, which are connected in series in the aforesaid sequence. The first filtering chamber 1 is connected to the top end of a chimney 4 through a bent duct 5, so as to receive exhaust gas from the chimney for cleansing the exhaust gas. The chimney 4 may be an existing one which is under operation, or it may be a new chimney which is to be constructed together with the exhaust gas cleansing device of the invention. More particularly, the device of the present invention can be installed in a currently operating plant without interrupting the operation of the chimney of the plant. A lid 7 is hinged to the top surface of the bent duct 5 in alignment with the vertical axial center line of the chimney. The hinge 6 of FIG. 1 is for swingably holding the lid 7. When the lid 7 is opened, the exhaust gas from the chimney 4 is directly delivered to the outside atmosphere through an opening of the duct 5, which opening is formed by the lid 7.

When the device of the present invention is to be installed next to an existing chimney, different component units of the device can be constructed at the site without being affected by the operating conditions of the chimney. This is possible because, when the duct 5 is installed, normal operation of the chimney is ensured by keeping the lid 7 in the opened state. It is apparent that, before the bent duct 5 is installed, the operation of the chimney 4 is not affected at all the installing work of the device of the invention. Upon completion of the installation of the device, the device can be tested at will be selectively opening and closing the lid 7. For remote operation of the lid 7, pulleys 9, 9' and an operating rope 8 are provided.

The bent duct 5 includes a cooling unit 10 which is located just prior to the first filtering chamber 1. As shown in FIG. 2, cooling water is circulated through the cooling means 10. More particularly, a pump 14 driven by a motor 13 feeds water from a tank 11 to the cooling means 10 through conduits 12 and 15, and the return water is delivered back to the tank 11 through conduit 16. The cooling means acts to cool down the exhaust gas from the chimney 4, for instance, from about 200°C to about 50°C. Water consumption in the cooling means 10 is compensated for by water supply through another conduit 17. It is also possible to precool the chimney exhaust gas by spraying water to the exhaust gas from nozzles 19 mounted on a spray tube 18 which is disposed in the proximity of the outlet of the chimney 4 in order to improve the cooling efficiency of the cooling means 10.

A gas distributing tube 20 is provided at inlet to the first filtering chamber 1, which tube 20 extends from the inlet of the chamber 1 to the middle portion thereof and has a plurality of perforations to cause the chimney exhaust gas to uniformly spread through the chamber 1. Spongy filtering members 21 are stuffed in the chamber 1. The dimensions of the gas distributing tube 20, such as its length, its inner and outer diameters, and the number of perforations, can be selected so as to meet the needs of each specific application. The spongy filtering members 21 are made of corrosion-resisting stainless steel wires, glass wool fibers, or vinyl chloride fibers. The wires and fibers for the filtering members 21 may be flattened. To facilitate gas passage, one or more exhaust gas passages 22 may be formed at the inlet of the first filtering chamber 1 between the wall thereof and the gas distributing tube 20.

Referring to FIG. 1, a plurality of nozzles 23 for injecting dust adsorber are mounted on the inner wall surface of the chamber 1. The first filtering chamber 1 also carries a plurality of washing liquid nozzles 24. A pump 27 is driven by a motor 26 so as to deliver the dust adsorber under pressure from a tank 25 thereof to the nozzles 23 through a conduit 28, so as to impregnate the spongy filtering members 21 with the dust adsorber by spraying it from the nozzles 23.

An example of the dust adsorber is a mixture which mainly consists of glycerine and CARBOCHICK (Trademark of Shell Oil Company), and contains a small amount each of polyhydric alcohol and ethylene oxide-propylene oxide random copolymer. Such mixture retains a high viscosity or stickiness, and is stable at a high temperature for the exhaust gas treatment, so as to generate no harmful gas and not to corrode the metallic parts of the cleansing device. Thus, the mixture is particularly suitable for adsorbing dust particles in the first filtering chamber 1. Furthermore, the mixture is water soluble, so that, after the dust adsorption, it can be washed off from the spongy filtering members 21 for re-impregnation thereof with fresh dust adsober. The fresh dust adsorber is, of course, sprayed to the spongy filtering members 21 through the nozzles 23. As being consumed, the dust adsorber is supplied to the tank 25 through a supply conduit 29.

Washing liquid is delivered under pressure from a tank 30 by a pump 31, which is driven by the motor 26, to the nozzles 24 through a conduit 32, so as to be sprayed to the spongy filtering members 21. The washing liquid removes the dust carrying adsorber from the filtering members 21. When the spongy filtering members 21 are washed by the washing liquid sprayed from the nozzles 24, valves 33 at the outlet of the first filtering chamber 1 are closed, so as to guide the washing liquid to a conduit 34 leading to a tank 35 together with the dust adsorber carrying dust particles. The discharge liquid which is collected in the tank 35 is brought to a filtering tank 36 through a conduit 37, so as to separate the dust particles from the dust adsorber containing liquid. The dust particles, which are separated at the filter 36 are discarded in a known manner, while the dust adsorber containing liquid is returned to the tank 30 through a conduit 38 for recirculation to the first filtering chamber 1. Since the dust adsorber is water soluble, plain water can be used as the washing liquid.

When the washing operation is not taking place in the first filtering chamber 1, the valves 33 are opened for communicating the outlet of the filter chamber 1 with the second filtering chamber 2 through a duct 39 having a motor-driven blower 40.

The second filtering chamber 2 also includes a gas distributing tube 41, which has a plurality of perforations and extends from the inlet of the chamber 2 to the middle portion thereof. Spongy filtering members 42 are stuffed in the chamber 2. The structure and the function of the gas distributing tube 41 and the spongy filtering members 42 are the same as those of the tube 20 and the filtering members 21 in the first filtering chamber 1, as described in detail hereinbefore. A plurality of caustic soda spray nozzles 43 are mounted on the sidewall of the second filtering chamber 2. A guide member 44 is disposed at the lower end of the second filtering chamber 2, so as to allow upward stream of the chimney exhaust gas while guiding and collecting caustic soda solution, for accumulating it in a tank 53 through a conduit 52.

To ensure the smooth flow of the exhaust gas, extra passages 45 are formed at the inlet of the second filtering chamber 2. The passages 45 are, of course, so disposed as to prevent leakage of the caustic soda solution therethrough.

Fresh caustic soda solution is delivered under pressure to the nozzles 43 from a tank 47 by a pump 49 through conduits 48 and 51. The pump 49 is driven by a motor 50. The caustic soda solution sprayed from the nozzles 43 to the spongy filtering members 42 is collected by the guide means 44 and recirculated to the chamber 2 through a conduit 54 and the aforesaid pump 49 and the conduit 51. When the caustic soda in the tank 53 is excessively soiled, it is branched off from the recirculating path, by means of a conduit 55. As the caustic soda is consumed, fresh supply is provided through a supply conduit 46.

A control panel 56 is provided for remotely controlling the operation of various elements of the device, such as the swingable lid 7, the pumps 27, 31, and 49 and the motors 26, 40, and 50.

The third filtering chamber 3 is provided at the top of the second filtering chamber 2, as an extension of the latter. The third filtering chamber 3 carries spongy filtering members 57 and activated charcoal 58 which are stuffed therein.

The operation of the device of the invention, as described in the foregoing, will now be explained.

To install the device of the invention next to an existing chimney 4 which is currently operated, the bent duct 5 is mounted on the chimney 4 while retaining the lid 7 as open. On the other hand, if the device of the invention is going to be installed at the time of constructing a new chimney, the lid 7 may be either opened or closed as the bent duct 5 is mounted on the chimney 4.

In operation, the exhaust gas from the chimney 4 is sucked to the first filtering chamber 1. The exhaust gas at the chimney is normally at about 200°C, and the cooling means 10 acts to reduce the exhaust gas temperature to about 50°C or below.

The chemical composition of the exhaust gas from the chimney 4 varies depending on the type of the plant to which the chimney belongs; for instance, an iron mill, a steel mill, and a fossil fuel power plant. The exhaust gas composition also somewhat varies as the fuel used is changed and as the combustion efficiency is changed. In any case, dust particles and noxious gases, such as sulfurous acid gas and oxides of nitrogen, should be removed before the exhaust gas is released to the outside. Especially, in the case of iron mills, particles consisting of iron oxides or the like have been known as a source of air pollution. With power plants which use heavy oil as fuel, the generation of noxious sulfurous acid gas is a problem to be solved.

The first filtering chamber 1 is to remove dust particles first of all. To this end, dust adsorber, which is, for instance, including main ingredients of glycerine and CARBOCHICK and being prestored in the tank 25 through the conduit 29, is now delivered to the nozzles 23 under pressure by the pump 27 through the conduit 28. The dust adsorber is then sprayed from the nozzles 23 and impregnated into the spongy filtering members 21. The valves 33 are opened to let the exhaust gas to proceed to the first filtering chamber 1. The inventor has found out that the use of the spongy filtering members 21 which are impregnated with the aforesaid dust adsorber results in almost complete removal of the dust particles from the exhaust gas. As a result, the exhaust gas which is delivered from the first filtering chamber 1 to the second filtering chamber 2 is substantially free from dust particles but it still contains noxious gases, such as sulfurous acid gas, as pollutants thereof.

After running the first filtering chamber 1 in the aforesaid manner for a certain time period, the valves 33 are clsoed, and cleaning water is sprayed to the inside of the chamber 1 from the tank 30 by the pump 31. The pump causes the spraying of the washing water under pressure from the nozzles 24. At the same time, the lid 7 is opened. Thus, the dust adsorber which has captured dust particles is washed off from the spongy filtering members 21, and the sprayed water is collected and delivered to the tank 35 through the conduit 34, together with the dust particles captured by the adsorber. The collected liquid in the tank 35 is then fed to the filtering tank 36, for separating the dust particles from the liquid which contains the aforesaid dust adsorber. The dust particles thus separated in the tank 36 is discarded in a known manner. The liquid from the filtering tank 36 is returned to the tank 30 for recirculation through the first filtering chamber 1. Fresh washing liquid may be supplied to the tank 30 through a suitable pipe (not shown) for supplementing the water consumption in the closed loop of the water passages. Upon completion of the washing, fresh dust adsorber is sprayed from the nozzles 23 for impregnation of the spongy filtering members 21 with the dust adsorber. Then, the lid 7 is closed and the valves 33 are opened for resuming the dust removing operation in the first filtering chamber 1.

An operator can remotely control the aforesaid dust removing operations from the control panel 56: namely, the opening and closing of the lid 7 and the valves 33, the washing off of the spongy filtering members 21 by the washing water, impregnation of the spongy filtering members 21 with the dust adsorber, and actuation and stopping of the motor-driven blower 40. The aforesaid washing off of the spongy filtering members 21 can be accomplished in a very short time, so that the period in which the lid 7 should be opened is very short. Accordingly, the risk of air pollution is greatly reduced, by drastically cutting down the amount of noxious exhaust gas release to the atmosphere.

The exhaust gas which has been treated in the first filtering chamber 1 is forwarded to the second filtering chamber 2 by the blower 40 through the duct 39. Sulfurous acid gas and nitrogen oxides contained in the exhaust gas are removed therefrom in the second filtering chamber 2. More particularly, caustic soda is forced to the nozzles 43 from the tank 47 by the pump 49 through the conduit 51. The caustic soda solution is continuously sprayed from the nozzles 43 to the spongy filtering members 42 which are stuffed in the second filtering chamber 2. Thereby, the caustic soda carried by the spongy filtering members 42 come in contact with the passing exhaust gas, so so as to absorb the nitrogen oxides therefrom and react with the sulfurous acid gas for producing sodium sulfite. The solution containing the reaction product of sodium sulfite is collected at the bottom of the second filtering chamber 2 and delivered to the recovery tank 53 by the conic guide member 44 through the conduit 52. The recovered solution is then returned for recirculation by the pump 49. Such flow of the caustic soda solution can be also remotely controlled from the control panel 56.

The concentration of the caustic soda to be used in the second filtering chamber 2, according to the present invention, depends on the concentration of sulfurous acid gas in the chimney exhaust. The inventor has found out that a caustic soda solution with a concentration of about 5% to 30% will be useful for most cases. The sulfurous acid gas concentration in the chimney exhaust varies, depending on the type of the fuel used and the manner in which the fuel is burnt. When the sulfurous acid gas concentration is very high, the concentration of the caustic soda should, of course, be increased accordingly.

As the caustic soda solution is circulated through the second filtering chamber 2 and the recovery tank 53 thereof, the concentration of the sodium sulfite therein increases. When the sodium sulfite concentration exceeds a certain predetermined level, the caustic soda solution containing such sodium sulfite is branched from the tank 53 through a conduit 55, and fresh caustic soda is supplied to the tank 47 through the conduit 46. The sodium sulfite in the recirculating solution may be separated by a suitable known method, so as to provide it as a marketable by-product.

The output from the second filtering chamber is almost completely cleansed, so that the risk of polluting the atmospheric air by the chimney exhaust gas is eliminated. However, as a safety means for the case that the exhaust gas has failed to be cleansed in the first and second filtering chambers 1 and 2, the third filtering chamber 3 is provided at the outlet of the second filtering chamber 2. The third filtering chamber 3 carries the spongy filtering members 57 and activated charcoal which are stuffed therein, so as to remove any pollutants remaining in the exhaust gas from the second filtering chamber 2.

If it is desired, a suitable electrostatic dust collector (not shown) may be disposed at the entry to the third filtering chamber 3, so as to capture the remaining iron oxide particles.

As described in the foregoing disclosure, according to the present invention, a device for removing noxious substances is provided which can be installed adjacent to an existing chimney or a new chimney to be constructed together with the device. The device of the invention almost completely removes noxious substances, especially sulfurous acid gas and nitrogen oxides, as well as dust particles from the chimney exhaust, so that clean gas is discharged to the air. Thus, the device of the present invention eliminates pollutants from the chimney exhaust gas. With the present invention, it is also possible to obtain a useful by-product of sodium sulfite. It is an important feature of the present invention that the device can be installed in the proximity of an existing chimney for the removal of pollutants from the exhaust gas therefrom, without interrupting the normal operation of the existing chimney. Above all, the noxious substance removing device of the present invention is highly efficient, very economical, and stable, and has a long service life.

What is claimed is:

1. An apparatus for removing noxious substances from chimney exhaust gas, comprising a first filtering chamber having an outlet and an inlet, said inlet communicating with the top end of the chimney through a bent duct and having spongy filtering members stuffed therein to assist in the removal of dust particles in the exhaust gas, a cooling means mounted on one end of the bent duct near to the inlet of the first filtering chamber, a first gas distributing tube having a plurality of perforations and extending downwardly from the inlet of the first filtering chamber toward the outlet thereof, a means for impregnating a liquid dust-absorbing agent in the spongy filtering members in the first filtering chamber, a means for spraying a washing liquid on the spongy filtering members in the first filtering chamber, a second filtering chamber having an outlet and an inlet, said inlet of the second filtering chamber communicating with the outlet of the first filtering chamber through a duct provided with a motor-driven blower, said second filtering chamber having spongy filtering members stuffed therein to assist in the removal of sulfurous acid gas and other noxious substances in the exhaust gas, a second gas distributing tube having a plurality of perforations and extending upwardly from the inlet of the second filtering chamber toward the outlet thereof, a means for causing circulation of caustic soda solution through the spongy filtering members in the second filtering chamber so as to absorb sulfurous acid gas and other noxious substances in the exhaust gas, and a third filtering chamber mounted at the outlet of the second filtering chamber and carrying spongy filtering members and activated charcoal therein to assist in the removal of any residual noxious substances in the exhaust gas, said third filtering chamber having an outlet for treated gas.

2. An apparatus as claimed in claim 1 wherein said bent duct has a top surface which is provided with a swingable lid the center of said lid being substantially in alignment with the vertical axial center line of the chimney.

3. An apparatus as claimed in claim 1 wherein said first filtering chamber is provided at the outlet thereof with valves operative to prevent washing liquid entering into said second chamber and to assist in the recovery of the washing liquid.

4. An apparatus as claimed in claim 1 wherein at least one exhaust gas passage is formed at the inlet of said first filtering chamber between the wall thereof and said gas distributing tube.

5. An apparatus as claimed in claim 1, wherein at least one exhaust gas passage is formed at the inlet of said second filtering chamber between the wall thereof and said gas distributing tube.

* * * * *